(12) United States Patent
LaBerge

(10) Patent No.: US 6,910,088 B2
(45) Date of Patent: *Jun. 21, 2005

(54) BUS ARBITRATION USING MONITORED WINDOWS OF TIME

(75) Inventor: Paul A. LaBerge, Shoreview, NM (US)

(73) Assignee: Micron Technology, Inc., Boise, ID (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/716,573

(22) Filed: Nov. 19, 2003

(65) Prior Publication Data

US 2004/0073733 A1 Apr. 15, 2004

Related U.S. Application Data

(63) Continuation of application No. 09/363,547, filed on Jul. 29, 1999, now Pat. No. 6,654,833.

(51) Int. Cl.[7] ...................... G06F 13/362; G06F 13/368; G06F 13/372
(52) U.S. Cl. ...................... 710/117; 710/116; 710/123; 710/124
(58) Field of Search ............................... 710/116, 240, 710/123, 124, 45, 309, 107, 117; 370/402

(56) References Cited

U.S. PATENT DOCUMENTS

| | | | | |
|---|---|---|---|---|
| 4,922,244 A | * | 5/1990 | Hullett et al. | 340/825.5 |
| 4,969,120 A | * | 11/1990 | Azevedo et al. | 710/117 |
| 5,168,568 A | * | 12/1992 | Thayer et al. | 710/125 |
| 5,241,632 A | * | 8/1993 | O'Connell et al. | 710/117 |
| 5,444,855 A | * | 8/1995 | Thompson | 710/107 |
| 5,499,345 A | * | 3/1996 | Watanabe | 710/117 |
| 5,560,016 A | * | 9/1996 | Fiebrich et al. | 710/240 |
| 5,581,782 A | * | 12/1996 | Sarangdhar et al. | 710/119 |
| 5,710,891 A | * | 1/1998 | Normoyle et al. | 710/119 |
| 5,740,380 A | * | 4/1998 | LaBerge et al. | 710/107 |
| 5,784,576 A | * | 7/1998 | Guthrie et al. | 710/302 |
| 5,822,549 A | * | 10/1998 | LaBerge | 710/107 |
| 5,845,097 A | * | 12/1998 | Kang et al. | 710/117 |
| 5,905,878 A | * | 5/1999 | LaBerge | 710/114 |
| 5,948,094 A | * | 9/1999 | Solomon et al. | 710/118 |
| 6,058,450 A | * | 5/2000 | LaBerge | 710/107 |
| 6,145,040 A | * | 11/2000 | LaBerge et al. | 710/107 |
| 6,654,833 B1 | * | 11/2003 | LaBerge | 710/107 |

OTHER PUBLICATIONS

On Slot Allocation for Time–Contrained Messages in Dual–Bus Networks—Ching–Chin Han—IEEE—Jul. 1997.*
A Pipeline–Based Approach for Maximal–Sized Matching Scheduling in Input–Buffered Switches—Eiji Oki, et al—IEEE—Jun. 2001.*
A Hard Real–Time Bus Arbitration Protocol based on EIA–709—Alexander Bauer, et al—IEEE—2002.*

* cited by examiner

Primary Examiner—Mark H. Rinehart
Assistant Examiner—Jeremy S. Cerullo
(74) Attorney, Agent, or Firm—Trop, Pruner & Hu, P.C.

(57) ABSTRACT

A method for use with a computer system includes permitting a first bus agent to access a bus during predetermined windows of time and preventing a second bus agent from accessing the bus outside of the windows. The first bus agent has a higher priority than the second bus agent. The method includes monitoring the use of the bus by the first bus agent during the window and the regulation durations of the windows are selectively regulated based on the use.

12 Claims, 3 Drawing Sheets

BUS ARBITRATION USING MONITORED WINDOWS OF TIME

This application is a continuation of prior application Ser. No. 09/363,547, filed on Jul. 29, 1999, now U.S. Pat. No. 6,654,833, issued on Nov. 25, 2003.

BACKGROUND

The invention relates to bus arbitration, such as arbitration on a local bus, for example.

Referring to FIG. 1, a typical computer system 8 may include a local bus 16 that may be owned for a particular bus operation by one of several bus agents. Because only one bus agent may own the local bus 16 at any particular time, the computer system 8 may use an arbitration scheme to determine which bus agent is granted ownership of the local bus 16 for the scenario in which multiple bus agents concurrently request ownership of the local bus 16. In this manner, the arbitration scheme may classify a particular bus agent as being either a priority bus agent 14 (a system controller, for example) or a symmetrical bus agent (processors 12a, 12b, 12c and 12d, as examples).

The symmetrical bus agents have the same priority level, and if multiple bus agents request ownership of the local bus 16 for the next bus operation, then the arbitration scheme awards ownership of the local bus 16 to the bus agent that has least recently used the local bus 16. To accomplish the above-described arbitration scheme, the local bus 16 may include bus request lines 17 that communicate bus request signals (called BREQ0#, BREQ1#, BREQ2# and BREQ3#, as examples), each of which may be driven by a different one of the processors 12 to request ownership of the local bus 16.

The priority bus agent asserts a signal (called BPRI#) to request ownership of the local bus 16. As its name implies, the priority agent 14 has a higher priority level than the symmetrical agents. Thus, if a symmetrical agent and the priority agent 14 concurrently request ownership of the local bus 16, the arbitration scheme ensures that the priority agent 14 is granted ownership of the local bus 16.

A difficulty with the above-described arrangement is that the priority agent 14 may become effectively parked on the local bus 16 and consume a substantial amount of the available bandwidth of the local bus 16. As a result, the symmetrical agents may be deprived from adequate use of the local bus 16.

Thus, there is a continuing need for an arrangement that addresses one or more of the above-stated problems.

SUMMARY

In one embodiment of the invention, a method for use with a computer system includes permitting a first bus agent to access a bus during predetermined windows of time and preventing a first bus agent from accessing the bus outside of the windows. The first bus agent has a higher priority than the second bus agent. Use of the bus by the second bus agent is monitored during the windows, and the duration of the windows are selectively regulated based on the use.

In another embodiment, a method for use with a computer system includes permitting a first bus agent to access a bus during predetermined windows of time. The first bus agent has a lower priority than the second bus agent. The second bus agent is prevented from accessing the bus during the windows, and use of the bus by the first bus agent is monitored during the windows. The durations of the windows are selectively regulated based on the use.

In yet another embodiment, a computer system includes a local bus, a processor that is coupled to the local bus, a system controller that is coupled to the local bus, and a circuit. The system controller has a higher priority than the processor for bus arbitration, and the circuit is adapted to permit the system controller to access the bus during windows of time and prevent the system controller from accessing the bus outside of the windows to permit the processor to access the bus, monitor use of the bus by the system controller during the windows, and selectively regulate the durations of the windows based on the use.

Advantages and other features of the invention will become apparent from the following description, from the drawing and from the claims.

DETAILED DESCRIPTION

Figure 1:
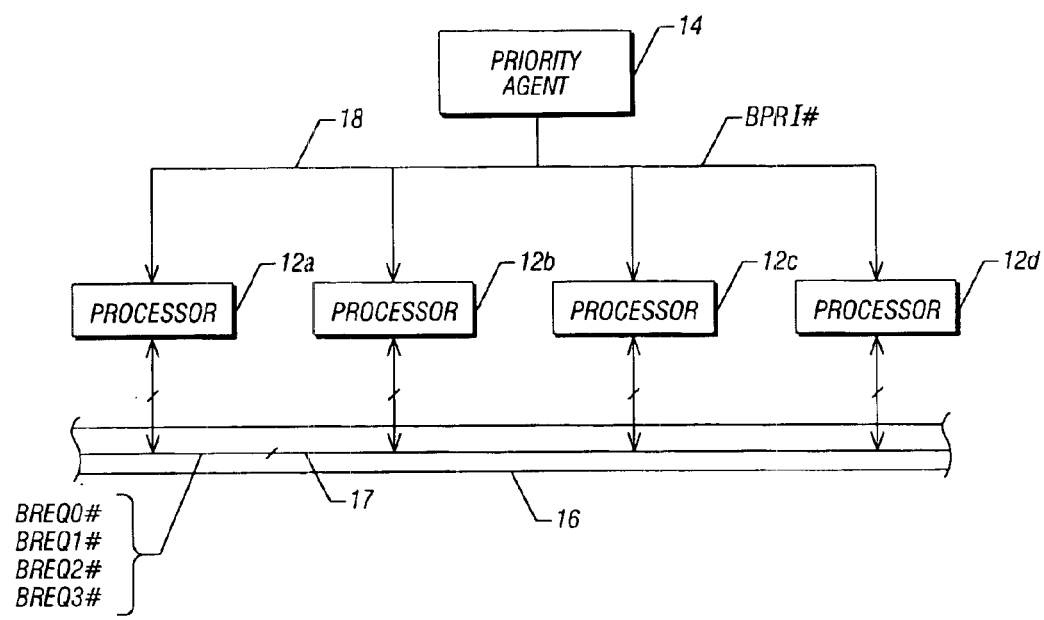
FIG. 1 is a schematic diagram of a computer system illustrating local bus agents of the prior art.
Figure 2:
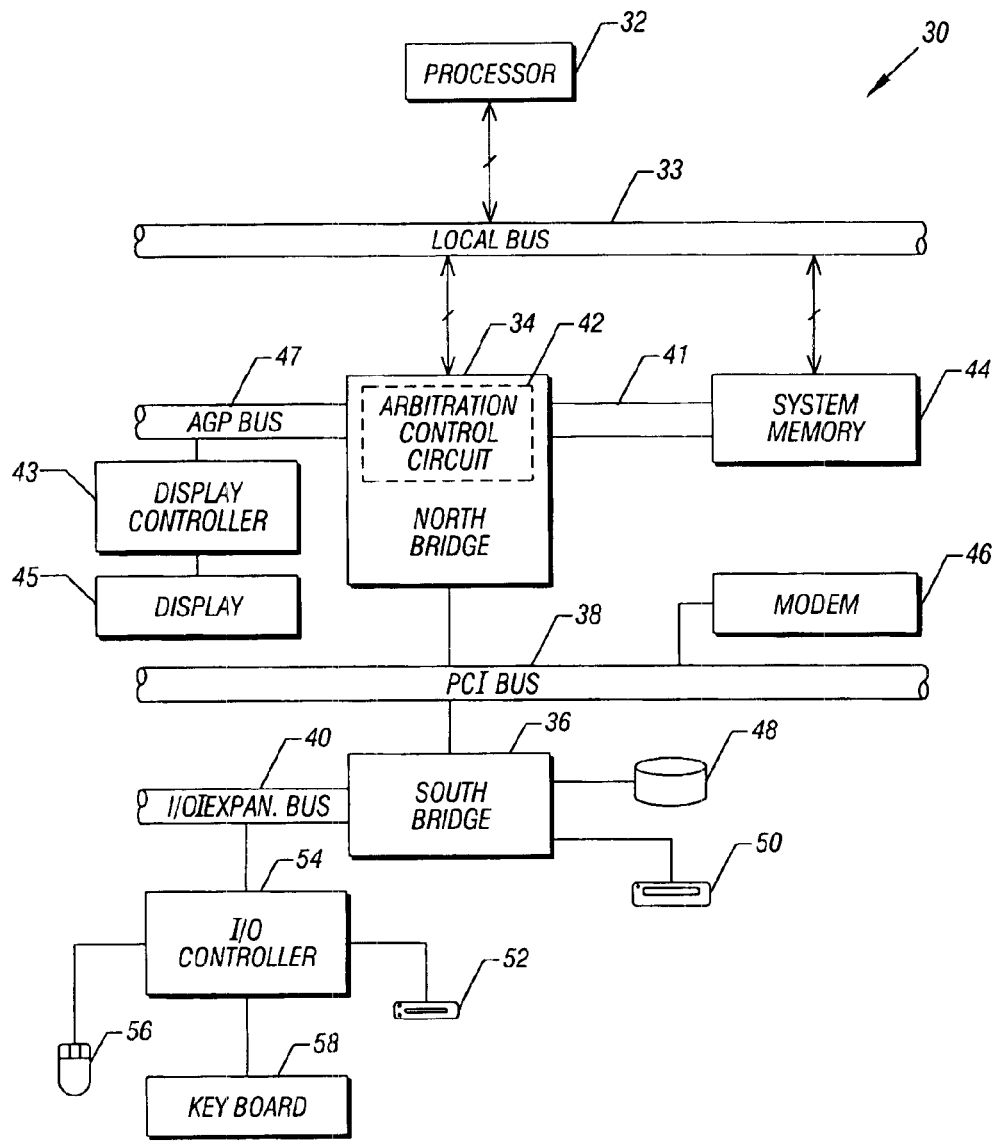
FIG. 2 is a schematic diagram of a computer system according to an embodiment of the invention.

Referring to FIG. 2, an embodiment 30 of a computer system in accordance with the invention includes at least two bus agents that are coupled to a processor, or local bus 33 (a Pentium Pro bus, for example): a processor 32 (a symmetrical agent) and a north bridge 34 (a priority agent). The north bridge 34 may function as a system controller for the computer system 30 by regulating access to the local bus 33 for devices that are downstream of the local bus 33. Because the north bridge 34 is a priority agent, the north bridge 34 has a higher priority level for purposes of arbitration than the processor 32. Thus, in general, if the north bridge 34 and the processor 32 concurrently request ownership of the local bus 33, the north bridge 34 wins the arbitration and is granted ownership of local bus 33. However, unlike conventional arrangements, the north bridge 34 permits the processor 32 to have sufficient access to the local bus 33 by generally establishing two windows of time for bus arbitration: one window of time in which the processor 32 may and the north bridge 34 may not request ownership of the local bus 33; and another window of time in which both the north bridge 34 and the processor 32 may request ownership of the local bus 33. If the north bridge 34 does not have any pending requests for ownership of the local bus 33, then the north bridge 34 permits the processor 32 to gain ownership of the local bus 33. In some embodiments, these two different windows may be generally interleaved in time, and the arbitration control circuit 42 regulates the durations of these windows for purposes of facilitating efficient use of the local bus 33, as described below.

Figure 3:
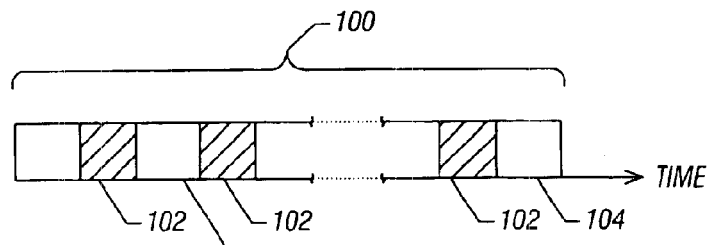
FIG. 3 is a timing diagram illustrating a window of time in which a system controller may assert a bus request signal according to an embodiment of the invention.

Referring also to FIG. 3, in this manner, the arbitration control circuit 42 may create a window 100 of time in which both the processor 32 and the north bridge 34 may request ownership of the local bus 33. It is noted that although during the window 100 the processor 32 may request ownership of the local bus 33, the processor's request may be trumped by a request for bus ownership by the north bridge 34. Thus, as depicted in FIG. 3, the window 100 may include time segments 102 in which the north bridge 34 requests ownership of the local bus 33 and time segments 104 in which the processor's request for the local bus 33 is granted (i.e., the north bridge 34 does not request access to the local bus 33 during the time segments 104).

In some embodiments, the arbitration control circuit 42 may initially set the duration of the window 100 to a predefined length. If during the window 100, the arbitration control circuit 42 determines (based on the observed time segments 102 and 104, as described below) that the north bridge 34 is over-utilizing the local bus 33 (i.e., if the arbitration circuit 42 determines that the north bridge 34 is "starving" the processor 32), then the arbitration control circuit 42 may terminate the window 100 and begin another window 110 (see FIG. 4) in which only the processor 32 may request use of the local bus 33.

The arbitration control circuit's determination of whether the north bridge 34 is over-utilizing the local bus 33 may depend on the type of application program(s) that are currently being executed by the processor 32. For example, the processor 32 may be executing an application program that causes a large amount of data to be transferred between a hard disk drive 48 (see FIG. 2) and a system memory 44 of the computer 30, a data transfer that must occur over the local bus 33 for purposes of preserving cache coherency. Furthermore, for this example, the program may require relatively minor processing power from the processor 32. Thus, for this scenario, the arbitration control circuit 42 permits the north bridge 34 to access the local bus 33 for a greater percentage of the window 100 than if, for example, the processor 32 is executing a processor-intensive program that uses relatively little interaction with devices that are located downstream of the north bridge 34. Therefore, during the window 100, the percentage of usage time (by the north bridge 34) that the arbitration control circuit 42 deems to be excessive depends on the application program(s) that are being executed by the processor 32. In some embodiments, an indication of this percentage may be stored in a configuration register of the north bridge 34, as described below. As other examples, the percentage of usage time may also be governed by many different factors, such as whether the computer system 30 is being used as a home computer, being used in a benchmark test, being used as a business computer, being used as a server, etc. Furthermore, when applications are being executed in a multitasking environment, the mix of the different types of applications may also govern the percentage of time.

Figure 4:
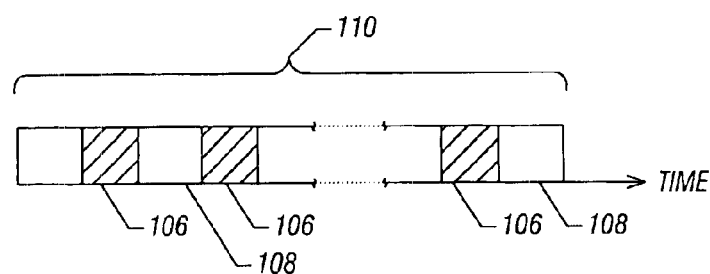
FIG. 4 is a timing diagram illustrating a window of time in which a processor may assert a bus request signal according to an embodiment of the invention.

Referring to FIG. 4, during the window 110, the arbitration control circuit 42 prevents the north bridge 34 from requesting ownership of the local bus 33. As a result, the processor 32 may fully utilize the local bus 33 during the window 110. For embodiments where other symmetric agents, such as other processors, are coupled to the local bus 33, arbitration between these agents may be based on a least recently used scheme.

The arbitration control circuit 42 monitors the processor's usage of the local bus 33 during the window 110 to determine if the processor 32 is under-utilizing the local bus 33. The under-utilization of the local bus 32 may depend on a variety of factors, such as those described above for determining the north bridge's permitted use of the local bus 33.

During the window 110, the processor 32 uses the local bus 33 during time segments 106 and does not use the local bus 33 during the other time segments 108. The arbitration control circuit 42 may monitor the time segments 106 and 108 to determine an ongoing percentage of utilization of the local bus 33 by the processor 32. If the percentage drops below a threshold, then the arbitration control circuit 42 deems that the processor 32 is under-utilizing the local bus 33 and terminates the window 110. At this point, the arbitration control circuit 42 may begin another window 100 to permit the north bridge 34 to access the additional bandwidth.

The threshold that is determinative of whether the local bus 33 is being underutilized during the window 110 may be dependent on the application program being executed by the processor 32. For example, if the processor 32 is executing an error correction/detection program (i.e., a "debug program"), then the permitted percentage of utilization may be lower than if, for example, the application program causes the disk drive 48 to transfer large amounts of data between the disk drive 48 and the system memory 44, a scenario where more utilization of the local bus 33 by the north bridge 34 is allowed. In some embodiments, an indication of this percentage may be stored in a configuration register of the north bridge 34, as described below.

Figure 5:
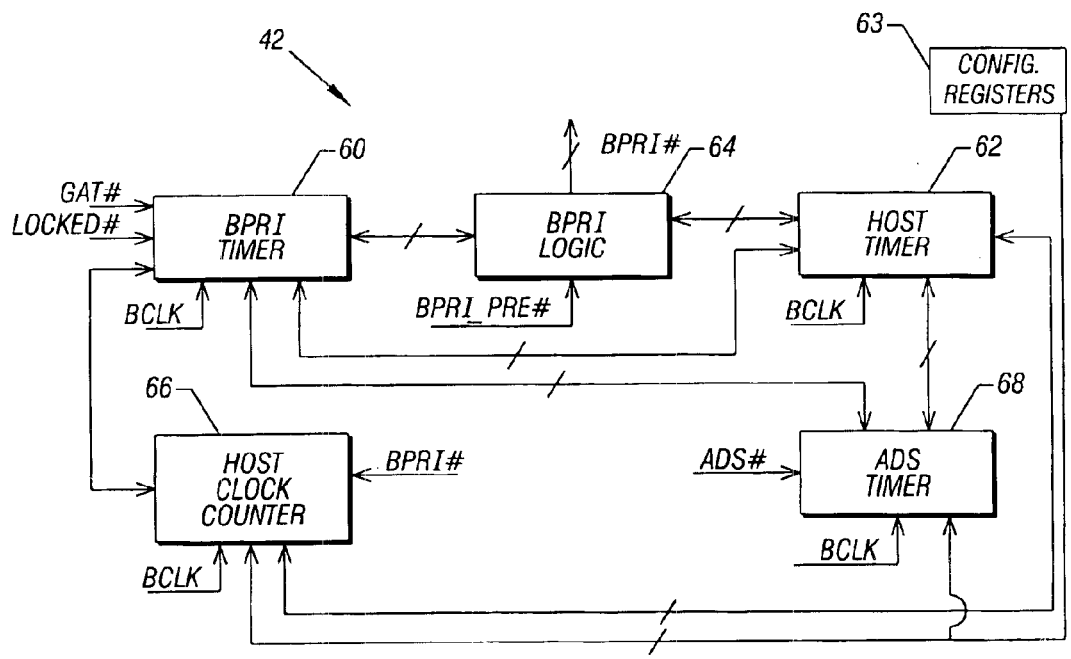
FIG. 5 is a schematic diagram of an arbitration control circuit of the computer system of FIG. 2 according to an embodiment of the invention.

Referring to FIG. 5, in some embodiments, the arbitration control circuit 42 may include a BPRI timer 60 that is used to measure the duration of the window 100 and a host timer 62 that is used to measure the duration of the window 110. The arbitration control circuit 42 may also include BPRI logic 64 that generates a bus request signal (for the north bridge 34) called BPRI#. In this manner, the BPRI logic 64 may receive a internal request signal called BPRI_PRE# signal (from other circuitry of the north bridge 34) to indicate assertion of the BPRI# signal is desired. However, the BPRI logic 64 asserts the BPRI# signal based on whether or not the BPRI timer 60 is concurrently measuring the window 100 (as indicated by the BPRI timer 60).

The duration of the window 100 may be shortened by a host clock counter 66 of the arbitration control circuit 42. In this manner, the host clock counter 66 functions as a timer that counts clock cycles of the local bus 34 (via a clock signal (called BCLK) of the local bus 33) when the BPRI# signal is asserted. More particularly, the host clock counter 66 counts up to a predetermined number (indicated by a value stored in a configuration register 63, for example) that establishes a limit on the north bridge's usage of the local bus 33 during the window 100. As long as the processor 32 is requesting use of the local bus 33, the BPRI# signal is deasserted, a condition that halts the counting by the host clock counter 66. However, when the BPRI# signal is asserted, a condition that indicates that the north bridge 34 is gaining ownership of the local bus 33, the host clock counter 66 counts on each cycle of the BCLK signal. In this manner, if the host clock counter 66 indicates the predetermined threshold before the expiration of the BPRI timer 60, then the duration of the window 100 is shortened. Therefore, the above-described arrangement ensures that there are X number of clock cycles for the processor 32 in Y number of clock cycles. Otherwise, the BPRI# signal is deasserted, and the host timer 62 begins measuring the window 110 to give additional bandwidth to the processor 32.

An ADS timer 68 of the arbitration control circuit 42 works in a similar manner to control the duration of the window 110. More particularly, the ADS timer 68 monitors a signal (of the local bus 33) called ADS# that indicates when the processor 32 is beginning a cycle on the local bus 33. In some embodiments, the ADS timer 68 counts the number of cycles of the BCLK signal that elapse between the processor's assertion of the ADS# signal. In this manner, the ADS timer 68 counts up to a predetermined threshold (established by a value that is stored in a configuration register 63) that indicates that a predetermined number of cycles of the BCLK signal has elapsed between cycles that are run by the processor 32. In other words, the ADS timer 68 only counts when the ADS# signal is deasserted and thus, indicates the collective duration of the time segments 108. If the ADS timer 68 reaches the predetermined number of clock cycles before the host timer 62 expires, then the local bus 33 is deemed to be under-utilized by the processor 32, a condition that causes the host timer 62 to terminate the window 110.

Referring back to FIG. 2, among the other features of the computer system 30, the north bridge 34 may provide an interface between the local bus 33, a Peripheral Component Interconnect (PCI) bus 38, a memory bus 41 (that is coupled to a system memory 44) and an Accelerated Graphics Port (AGP) bus 47. The AGP is described in detail in the Accelerated Graphics Port Interface Specification, Revision 1.0, published on Jul. 31, 1996, by Intel Corporation of Santa Clara, Calif. The PCI Specification is available from the PCI Special Interest Group, Portland, Oreg. 97214.

The PCI bus 38 may also be coupled to a modem 46 and a south bridge 36 that provides an interface to an input/output (I/O) expansion bus 40, a CD-ROM drive 50 and the hard disk drive 48. An I/O controller 54 may be coupled to the I/O expansion bus 40 and receive input data from a mouse 56 and a keyboard 58. The I/O controller 54 may also control operations of a floppy disk drive 52. As depicted in FIG. 2, the computer system 30 includes a display controller 43 that is connected to the AGP bus 47. A display is connected to the display controller 43.

In this content, the term "processor" may generally refer to at least one central processing unit (CPU), microcontroller or microprocessor, as just a few examples. The phrase "computer system" may refer to any type of processor-based system, such as a desktop computer or a laptop computer, as just a few examples. Thus, the invention is not intended to be limited to the illustrated computer system 30, but rather, the computer system is an example of one of many possible embodiments.

While the invention has been disclosed with respect to a limited number of embodiments, those skilled in the art, having the benefit of this disclosure, will appreciate numerous modifications and variations therefrom. It is intended that the appended claims cover all such modifications and variations as fall within the true spirit and scope of the invention.

What is claimed is:

1. A method comprising:

establishing windows of time for a first bus agent to request access to a bus;

for times outside of the windows, denying all requests from the first bus agent to access the bus;

monitoring accesses to the bus during the windows; and selectively regulating durations of the windows in response to the monitoring.

2. The method of claim 1, wherein the first bus agent comprises:

a system controller.

3. The method of claim 1, further comprising:

for times outside of the windows, selectively granting requests from a processor.

4. The method of claim 1, wherein the act of monitoring comprises:

determining a number of clock cycles in which first bus agent accesses the bus during the window.

5. The method of claim 1, wherein the act of regulating comprises:

decreasing the duration of one of the windows if the amount of use by the first bus agent approximately increases above a threshold.

6. The method of claim 1, wherein the act of monitoring comprises:

counting clock cycles when the first bus agent requests ownership of the bus.

7. The method of claim 1, wherein the bus comprises:

a local bus.

8. A bridge usable with a first bus agent that has higher priority for accesses to a bus than a second bus agent, the bridge comprising:

a circuit adapted to:

permit the first bus agent to access the bus during windows of time and prevent the first bus agent from accessing the bus outside of the windows to permit the second bus agent to access the bus, monitor use of the bus by the first bus agent during the windows, and selectively regulate the durations of the windows in response to the monitored use.

9. The bridge of claim 8, wherein the first bus agent comprises a system controller and the second bus agent comprises a processor.

10. The bridge of claim 8, wherein the circuit comprises:

a timer adapted to determine a number of clock cycles in which the first bus agent accesses the bus during one of the windows.

11. The bridge of claim 8, wherein the circuit is adapted to regulate the durations by decreasing the duration of one of the windows if the amount of use of the bus by the first bus agent approximately increases above a threshold.

12. The bridge of claim 8, wherein the circuit comprises:

a timer adapted to not count clock cycles when the second bus agent accesses the bus and count clock cycles when the first bus agent accesses the bus.

* * * * *